(12) United States Patent
Lin

(10) Patent No.: US 9,038,786 B2
(45) Date of Patent: May 26, 2015

(54) MULTIFUNCTIONAL CASTOR

(71) Applicant: Qing-Song Lin, Yunlin County (TW)

(72) Inventor: Qing-Song Lin, Yunlin County (TW)

(73) Assignee: CATIS PACIFIC MFG. CORP. LTD., Yunlin County (TW)

( * ) Notice: Subject to any disclaimer, the term of this patent is extended or adjusted under 35 U.S.C. 154(b) by 71 days.

(21) Appl. No.: 14/049,625

(22) Filed: Oct. 9, 2013

(65) Prior Publication Data

US 2015/0096846 A1    Apr. 9, 2015

(51) Int. Cl.
*B60B 33/00* (2006.01)
*B60B 33/02* (2006.01)

(52) U.S. Cl.
CPC ........... *B60B 33/0078* (2013.01); *B60B 33/021* (2013.01); *Y10T 16/184* (2013.01)

(58) Field of Classification Search
CPC ...... B60B 33/02; B60B 33/021; Y10T 16/18; Y10T 16/182; Y10T 16/184; Y10T 16/1853; Y10T 16/1857

USPC .......................................................... 188/1.12
See application file for complete search history.

(56) References Cited

U.S. PATENT DOCUMENTS

| | | | |
|---|---|---|---|
| 8,117,715 B2* | 2/2012 | Tsai et al. ..................... | 16/35 R |
| 8,393,053 B2* | 3/2013 | Melara .......................... | 16/35 R |
| 8,789,662 B2* | 7/2014 | Childs et al. ................. | 188/1.12 |

* cited by examiner

*Primary Examiner* — Vishal Sahni
(74) *Attorney, Agent, or Firm* — Patent Office of Bang Shia

(57) ABSTRACT

A multifunctional castor with steering, directional and brake functions and is provided with a mounting seat, a rotary seat, an engaging member, a wheel, a brake swing member, a longitudinal rod assembly, an engaging assembly, a transverse rod, a brake pedal and a brake-release pedal. Pressing down or pushing up the brake pedal can activate the steering, direction and brake functions of the castor, and then the steering, direction and brake functions of the castor can be deactivated by controlling the brake-release pedal.

8 Claims, 10 Drawing Sheets

MULTIFUNCTIONAL CASTOR

BACKGROUND OF THE INVENTION

1. Field of the Invention

The present invention relates to a castor, and more particular to a multifunctional castor with steering, directional and brake functions.

2. Description of the Prior Art

Castors are fixed at the bottom of an equipment (such as sickbed, work platform, and etc) for easy moving, and most of the castors are provided with brake device for positioning of the equipment.

The existing castors are generally divided into two categories: the straight type castor without steering function which is able to roll back and forth in a straight-line manner, and the pivotable castor with steering function which is able to steer around while rolling. However, the existing castors still have the following disadvantages:

The castor with steering function will pivot horizontally while rolling during the movement of the equipment, which makes the moving direction of the castors uncontrollable.

The castor without steering function can move stably along a straight line but is unable to steer around when encountering obstacles.

The present invention has arisen to mitigate and/or obviate the afore-described disadvantages.

SUMMARY OF THE INVENTION

The primary objective of the present invention is to provide a multifunctional castor with steering, directional and brake functions.

To achieve the above objectives, a multifunctional castor in accordance with the present invention a mounting seat, a rotary seat, an engaging member, a wheel, a brake swing member, a longitudinal rod assembly, an engaging assembly, a transverse rod, a brake pedal and a brake-release pedal. The mounting seat has a shaft portion. The rotary seat is rotatably mounted on the mounting seat and has a pivot portion pivoted to the shaft portion. The engaging member is fixed in the rotary seat and includes an engaging hole and an engaging tooth. The wheel is rotatably disposed on the rotary seat and includes a wheel toothed portion. The brake swing member includes a brake pivot portion pivoted to the rotary seat, a brake press portion located at one side of the brake pivot portion, and a brake toothed portion located at another side of the brake pivot portion and used to engage with or disengage from the wheel toothed portion. The longitudinal rod assembly is disposed in the shaft portion and the rotary seat in such a manner that the longitudinal rod assembly is moveable along an axial direction of the shaft portion and includes: a first end, a second send abutting against the brake press portion, and a first shoulder portion and a second shoulder portion between the first and second ends. The engaging assembly is disposed between the first and second shoulder portions of the longitudinal rod assembly and includes a protruding engaging portion for engaging with or disengaging from the engaging hole of the engaging member, and an engaging toothed portion for engaging with or disengaging from the engaging tooth of the engaging member. The transverse rod is inserted in the shaft portion and includes a push portion for pushing against the first end of the first longitudinal rod, and a press portion located opposite the push portion. The brake pedal is pivotally mounted on the mounting seat and includes an operation pivot portion pivoted to the mounting seat, an operation pedal portion located at one end of the operation pivot portion, and a directional stepped portion, a normal stepped portion and a brake stepped portion which are located at another end of the operation pivot portion and selectively pressed against the press portion of the transverse rod, when the normal stepped portion is pressed against the press portion, the protruding engaging portion and the engaging toothed portion of engaging assembly are disengaged from the engaging tooth and the engaging hole of the engaging member, respectively, the brake toothed portion of the brake swing member is disengaged from the wheel toothed portion of the wheel, so that the rotary seat is allowed to rotate with respect to the mounting seat, and the wheel is allowed to rotate relative to the rotary seat, when the directional stepped portion is pressed against the press portion, and the protruding engaging portion of the second toothed member is engaged in the engaging hole of the engaging member, the rotary seat is unable to rotate with respect to the mounting seat, when the brake stepped portion is pressed against the press portion, the engaging toothed portion of the engaging assembly is engaged with the engaging tooth of the engaging member, and the brake toothed portion of the brake swing member engages with the wheel toothed portion of the wheel, the wheel is stopped from rotating with respect to the rotary seat. The brake-release pedal is pivotally disposed in the mounting seat in such a manner that the brake-release pedal will pivot back to its original position after being pressed down, and pressing down the brake-release pedal makes the normal stepped portion of the brake pedal push against the press portion.

Preferably, the mounting seat includes a fixing portion fixed to a bottom of the equipment.

Preferably, a bearing is disposed between the pivot portion and the shaft portion of the mounting seat.

Preferably, the longitudinal rod assembly includes a first longitudinal rod and a second longitudinal rod, the first longitudinal rod is disposed in the shaft portion and movable along the axial direction of the shaft portion, the first longitudinal rod includes the first end, a first connecting portion opposite the first end, and the first shoulder portion located between the first end and the first connecting portion, the second longitudinal rod includes a second connecting portion for connecting the first connecting portion, the second end located opposite the second connecting portion and leaned against the brake press portion, and the second shoulder portion located between the second connecting portion and the second end.

Preferably, the engaging assembly includes a washer, a first toothed member, a second toothed member and a spring, the washer is sleeved on the second connecting portion of the second longitudinal rod and abutted against the second shoulder portion, the first toothed member is sleeved onto the second connecting portion and includes the engaging toothed portion and an inner toothed hole, the second toothed member is sleeved onto the second connecting portion and abutted against the washer and includes a toothed cavity for insertion of the first connecting portion of the first longitudinal rod, an annular portion against which is the first shoulder portion is abutted, the protruding engaging portion located around the annular portion, and a toothed portion inserted in the inner toothed hole of the first toothed member, and the spring is disposed between the first toothed member and the annular portion of the second toothed member.

Preferably, the push portion is pushed against the first end of the first longitudinal rod via slanting surfaces.

Preferably, the rotary seat includes a main body on which being formed the pivot portion, and a secondary body which is formed on the main body and includes an abutting portion, the brake swing member further comprises a brake elastic portion connected to the brake press portion and used to press against the abutting portion of the secondary body, so as to produce an upward push force for pushing the brake press portion.

Preferably, the brake-release pedal includes a brake-release pivot portion pivoted to the mounting seat, a brake-release pedal portion at one end of the brake-release pivot portion, and a first brake-release protrusion and a second brake-release protrusion at another end of the brake-release pivot portion, the brake pedal further comprises a first abutting surface located at the same side as the operation pedal portion, and a second abutting surface located at the same side as the directional stepped portion, when the directional stepped portion is pressed by the press portion, the first abutting surface abuts against the first brake-release protrusion, and when the brake stepped portion is pressed by the press portion, the second abutting surface abuts against the second brake-release protrusion.

DETAILED DESCRIPTION OF THE PREFERRED EMBODIMENTS

Figure 1:
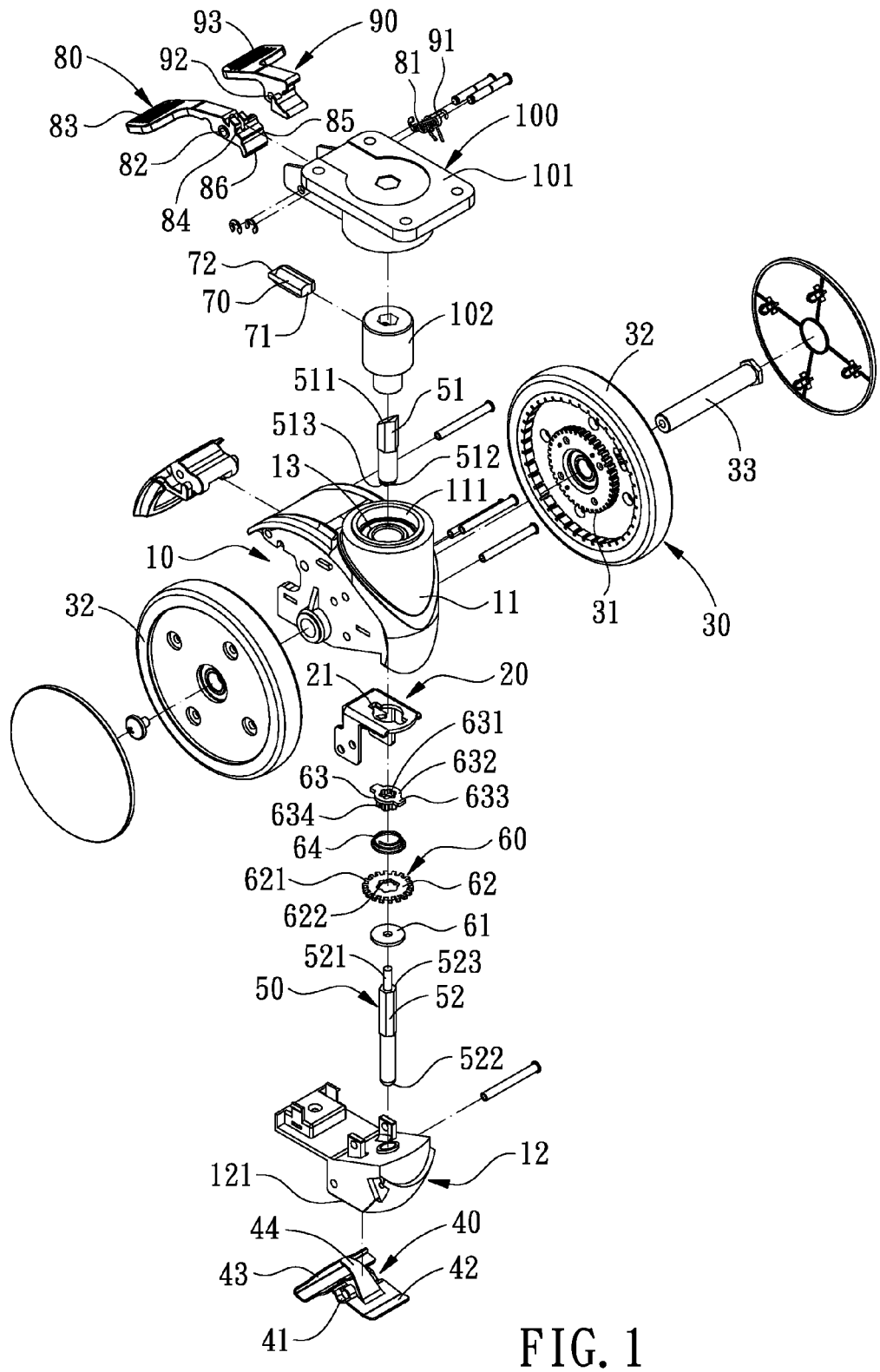
FIG. 1 is an exploded view of a multifunctional castor in accordance with the present invention.
Figure 2:
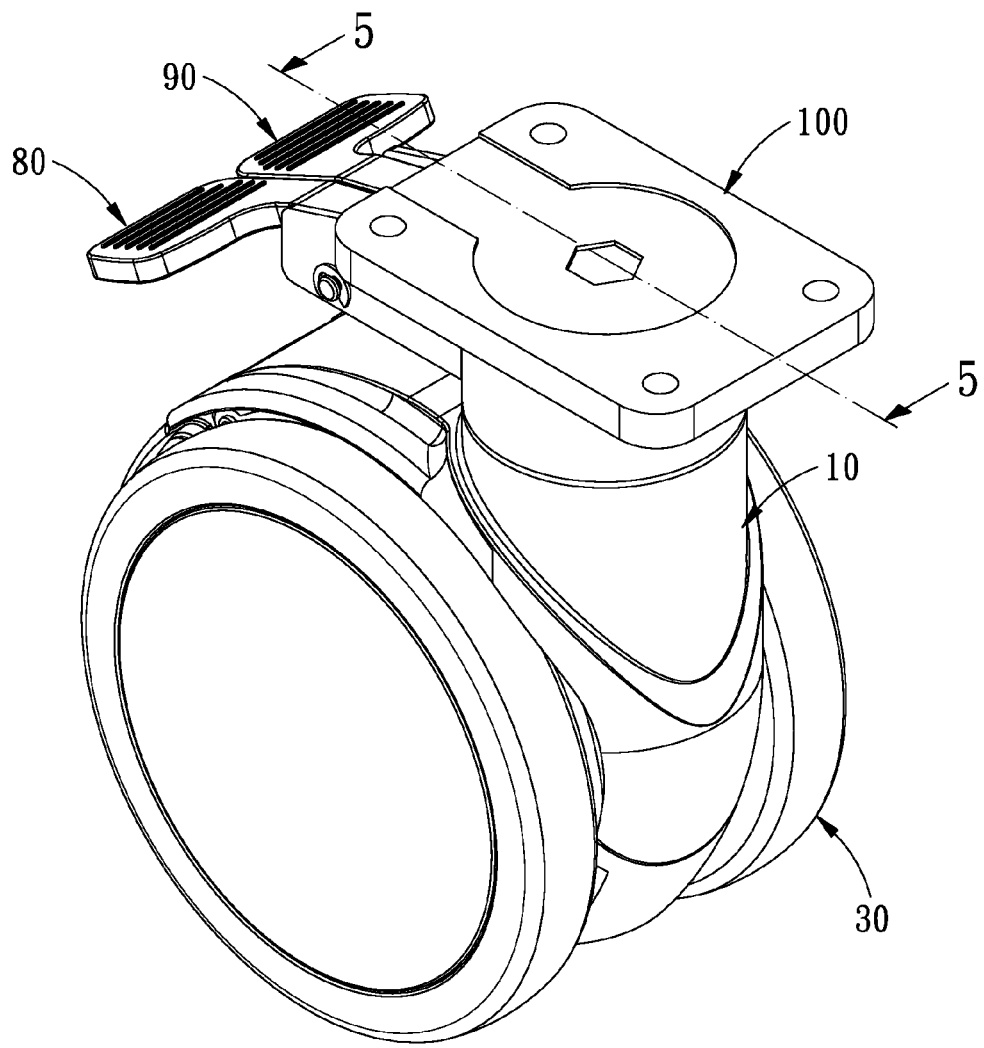
FIG. 2 is an assembly view of the multifunctional castor in accordance with the present invention.

The present invention will be clearer from the following description when viewed together with the accompanying drawings, which show, for purpose of illustrations only, the preferred embodiment in accordance with the present invention.

Referring to FIGS. 1-5, a multifunctional castor in accordance with the present invention is fixed to the bottom of an equipment 200 and comprises: a mounting seat 100, a rotary seat 10, an engaging member 20, a wheel 30, a brake swing member 40, a longitudinal rod assembly 50, an engaging assembly 60, a transverse rod 70, a brake pedal 80 and a brake-release pedal 90.

The mounting seat 100 includes a fixing portion 101 fixed to the bottom of the equipment 200 by screw means, and a shaft portion 102 extending downward from the fixing portion 101.

The rotary seat 10 is rotatably mounted on the mounting seat 100 and includes a pivot portion 111 pivoted to the shaft portion 102. In this embodiment, the rotary seat 10 includes a main body 11 on which being formed the pivot portion 111, and a secondary body 12 which is formed on the main body 11 and includes an abutting portion 121. Between the pivot portion 111 and the shaft portion 102 of the mounting seat 100 is disposed a bearing 13 which enables the rotary seat 10 to able to rotate with respect to the mounting seat 100.

The engaging member 20 is fixed in the rotary seat 10 and includes an engaging hole 21 and an engaging tooth 22 located a distance away from the engaging hole 21, and the engaging hole 21 is located closer than the engaging tooth 22 to the shaft portion 102.

The wheel 30 is rotatably disposed on the main body 11 of the rotary seat 10 and includes a wheel toothed portion 31. The wheel 30 consists of two wheel members 32 and has a pivot 33 inserted through the two wheel members 32 and the main body 11.

The brake swing member 40 includes a brake pivot portion 41 pivoted to the secondary body 12 of the rotary seat 10, a brake press portion 42 located at one side of the brake pivot portion 41, and a brake toothed portion 43 located at another side of the brake pivot portion 41 and used to engage with or disengage from the wheel toothed portion 31. In this embodiment, the brake swing member 40 further comprises a brake elastic portion 44 connected to the brake press portion 42 and used to press against the abutting portion 121 of the secondary body 12, so as to produce an upward push force pushing the brake press portion 42.

The longitudinal rod assembly 50 is disposed in the shaft portion 102 and the rotary seat 10 in such a manner that the longitudinal rod assembly 50 is moveable along the axial direction of the shaft portion 102 and includes: a first end 511, a second end 522 abutting against the brake press portion 42, and a first shoulder portion 513 and a second shoulder portion 523 between the first and second ends 511, 522. The brake press portion 42 keeps pushing the longitudinal rod assembly 50 upward. In this embodiment, the longitudinal rod assembly 50 includes a first longitudinal rod 51 and a second longitudinal rod 52. The first longitudinal rod 51 is disposed in the shaft portion 102 and movable along the axial direction of the shaft portion 102 but unable to rotate with respect to the shaft portion 102. The first longitudinal rod 51 includes the first end 511, a first connecting portion 512 opposite the first end 511, and the first shoulder portion 513 located between the first end 511 and the first connecting portion 512. The second longitudinal rod 52 is movably inserted in the secondary body 12 but unable to with respect to the secondary body 12 and includes a second connecting portion 521 for connecting the first connecting portion 512, the second end 522 located opposite the second connecting portion 521 and leaned against the brake press portion 42, and the second shoulder portion 523 located between the second connecting portion 521 and the second end 522.

The engaging assembly 60 is disposed between the first and second shoulder portions 513, 523 of the longitudinal rod assembly 50 and includes a protruding engaging portion 633 for engaging with or disengaging from the engaging hole 21 of the engaging member 20, and an engaging toothed portion 621 for engaging with or disengaging from the engaging tooth 22 of the engaging member 20. In this embodiment, the engaging assembly 60 includes a washer 61, a first toothed member 62, a second toothed member 63 and a spring 64. The washer 61 is sleeved on the second connecting portion 522 of the second longitudinal rod 52 and abutted against the second shoulder portion 523. The first toothed member 62 is sleeved onto the second connecting portion 522 and includes the engaging toothed portion 621 and an inner toothed hole 622.

The second toothed member 63 is sleeved onto the second connecting portion 522 and abutted against the washer 61 and includes a toothed cavity 631 for insertion of the first connecting portion 512 of the first longitudinal rod 51, an annular portion 632 against which is the first shoulder portion 513 is abutted, the protruding engaging portion 633 located around the annular portion 632, and a toothed portion 634 inserted in the inner toothed hole 622 of the first toothed member 62. The spring 64 is disposed between the first toothed member 62 and the annular portion 632 of the second toothed member 63.

The transverse rod 70 is inserted in the shaft portion 102 and includes a push portion 71 for pushing against the first end 511 of the first longitudinal rod 51, and a press portion 72 located opposite the push portion 71. In this embodiment, the push portion 71 is pushed against the first end 511 of the first longitudinal rod 51 via slanting surfaces.

The brake pedal 80 is pivotally mounted on the mounting seat 100 via a first spring 81 and includes an operation pivot portion 82 pivoted to the mounting seat 100, an operation pedal portion 83 located at one end of the operation pivot portion 82, and a directional stepped portion 84, a normal stepped portion 85 and a brake stepped portion 86 which are located at another end of the operation pivot portion 82 and selectively pressed against the press portion 72 of the transverse rod 70. In this embodiment, the brake pedal 80 further comprises a first abutting surface 87 located at the same side as the operation pedal portion 83, and a second abutting surface 88 located at the same side as the directional stepped portion 84. With the directional stepped portion 84, the normal stepped portion 85 and the brake stepped portion 86 selectively abutting against the press portion 72 of the transverse rod 70, the directional function (setting the castor in a predetermined direction), steering function, and brake function of the castor can be carried out.

The brake-release pedal 90 is pivotally disposed in the mounting seat 100 by a second spring 91 in such a manner that the brake-release pedal 90 will pivot back to its original position after being pressed down. Pressing down the brake-release pedal 90 make the normal stepped portion 85 of the brake pedal 80 push against the press portion 72. In this embodiment, the brake-release pedal 90 includes a brake-release pivot portion 92 pivoted to the mounting seat 100, a brake-release pedal portion 93 at one end of the brake-release pivot portion 92, and a first brake-release protrusion 94 and a second brake-release protrusion 95 at another end of the brake-release pivot portion 92. When the directional stepped portion 84 is pressed by the press portion 72, the first abutting surface 87 will abut against the first brake-release protrusion 94, and when the brake stepped portion 86 is pressed by the press portion 72, the second abutting surface 88 will abut against the second brake-release protrusion 85.

Figure 6:
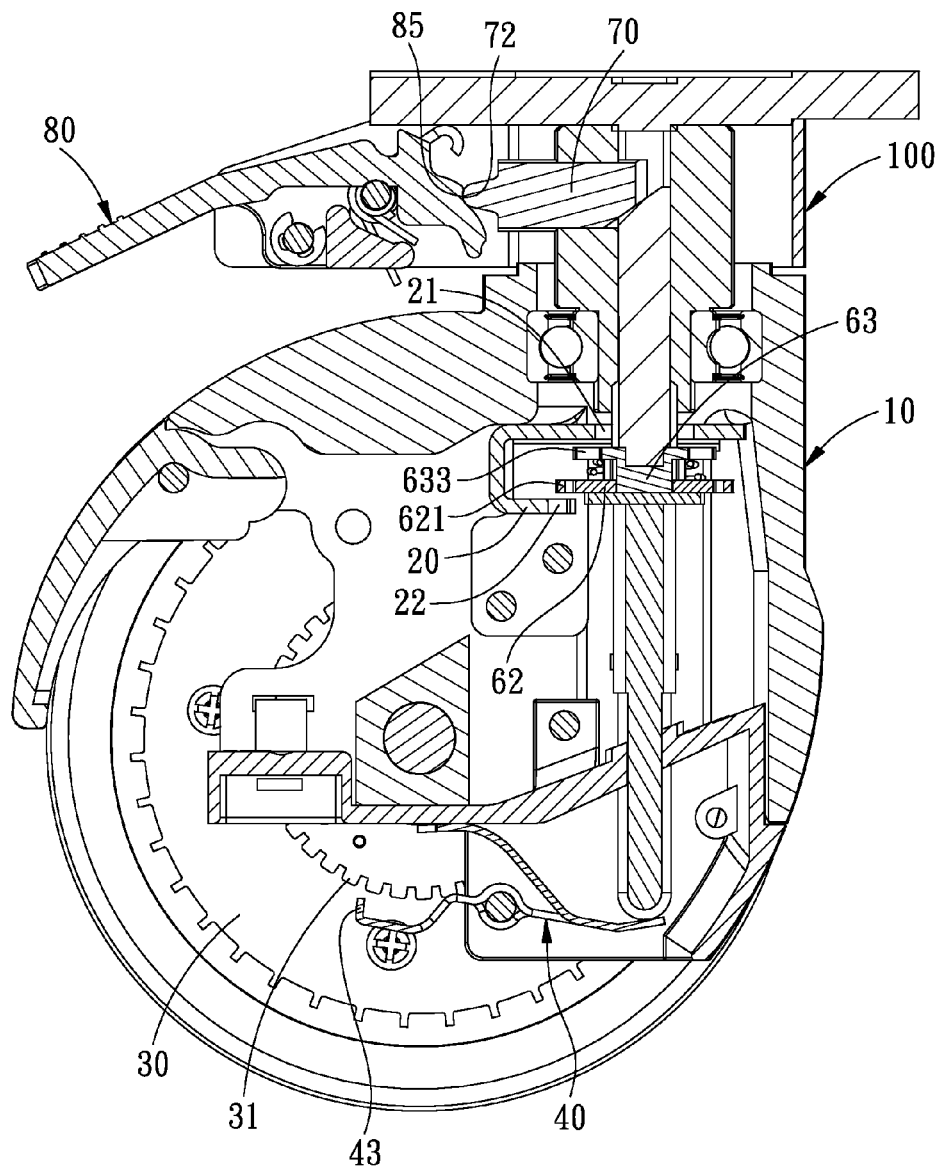
FIG. 6 shows that the steering function of the castor of the present invention has been activated.

To activate the steering function of the castor in accordance with the present invention, as shown in FIG. 6, the user can press the press portion 72 of the transverse rod 70 with the normal stepped portion 85 of the brake pedal 80, so that the engaging toothed portion 621 of the first toothed member 62 and the protruding engaging portion 633 of the second toothed member 63 will be disengaged from the engaging tooth 22 and the engaging hole 21 of the engaging member 20, respectively. Meanwhile, the brake toothed portion 43 of the brake swing member 40 will be disengaged from the wheel toothed portion 31 of the wheel 30, so that the rotary seat 10 is able to rotate with respect to the mounting seat 100, the wheel 30 is able to rotate relative to the rotary seat 10, and thus the castor of the present invention is capable of steering freely during running.

Figure 3:
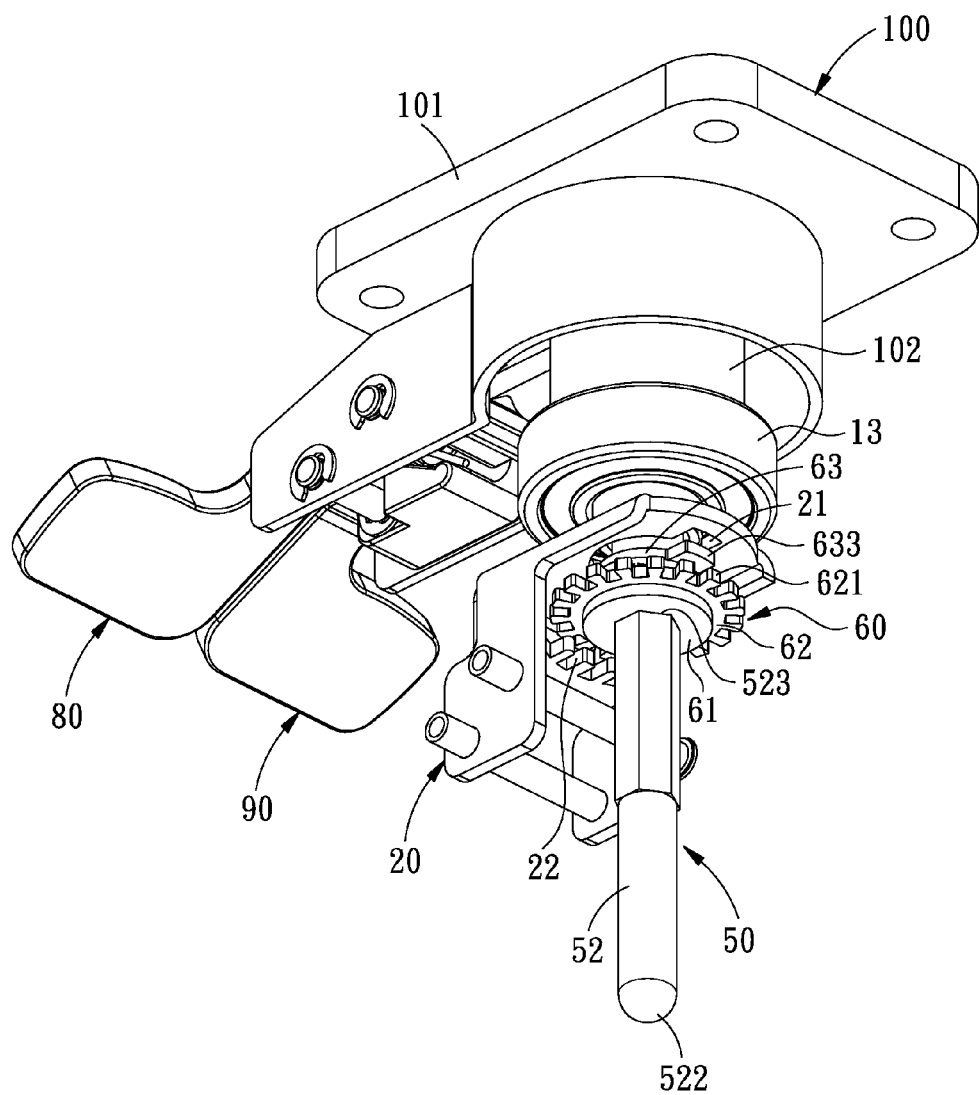
FIG. 3 is an illustrative view of the multifunctional castor in accordance with the present invention, showing that the mounting seat, the engaging member, the longitudinal rod assembly, the engaging assembly, the brake pedal and the brake-release pedal are assembled together.
Figure 4:
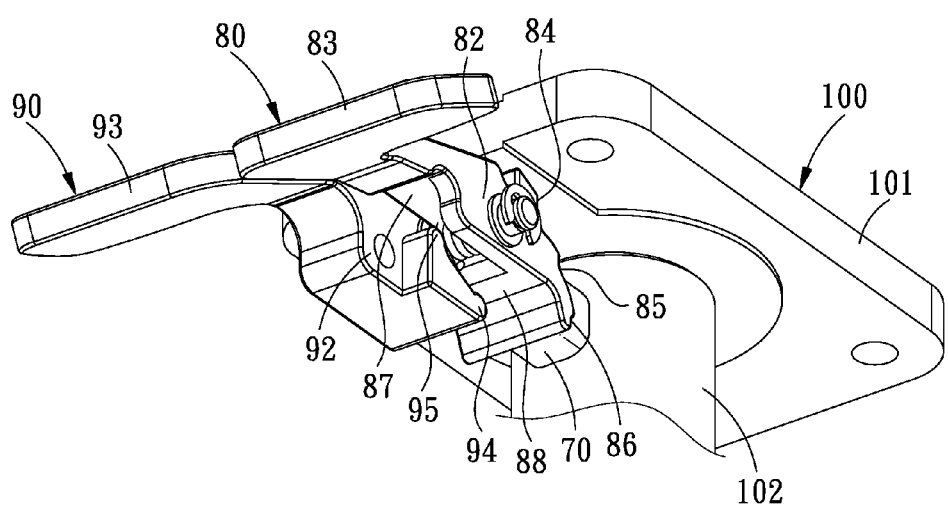
FIG. 4 is an assembly of the present invention showing the brake pedal and the brake-release pedal.
Figure 5:
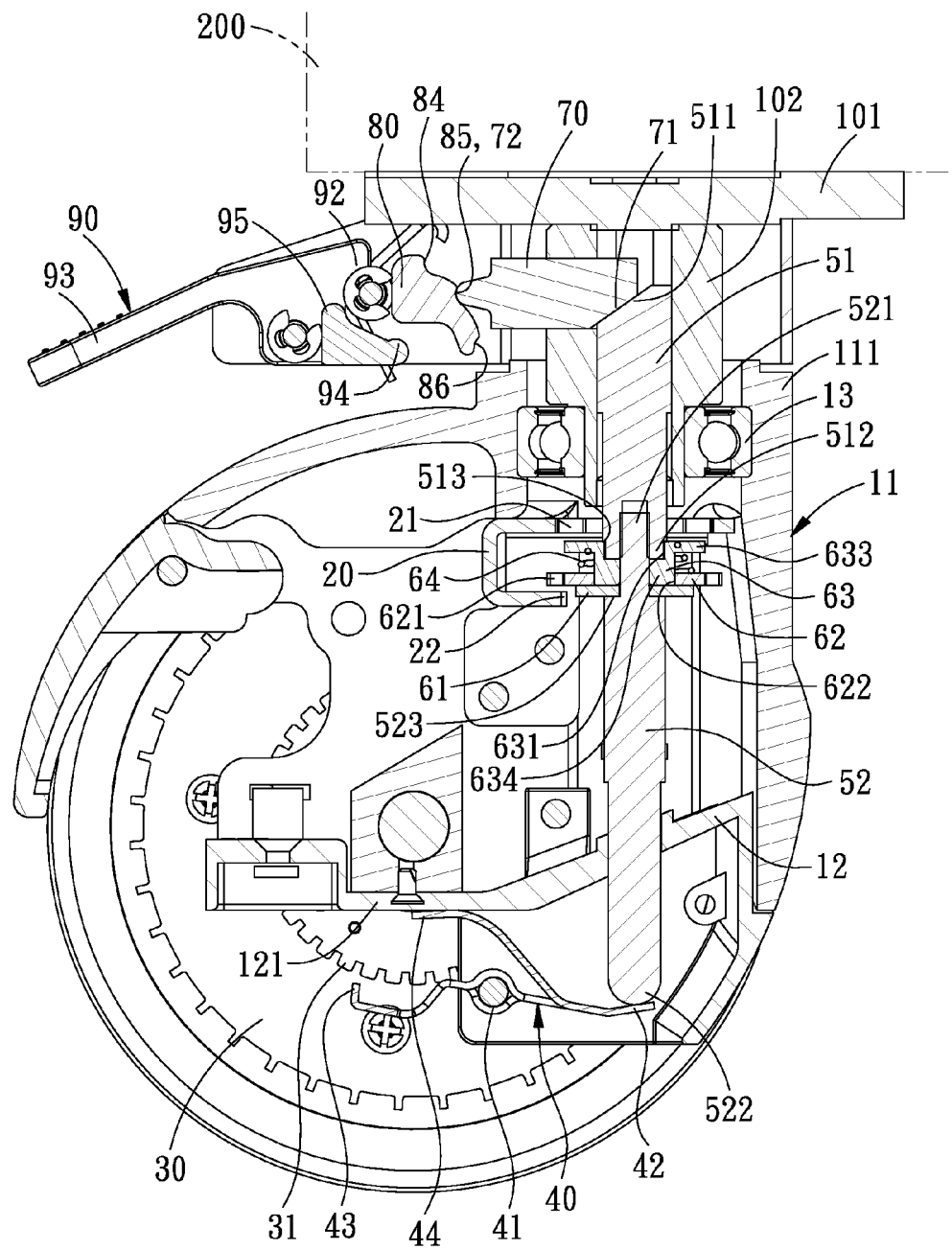
FIG. 5 is a cross sectional view taken along the line 5-5 of FIG. 2.
Figure 7:
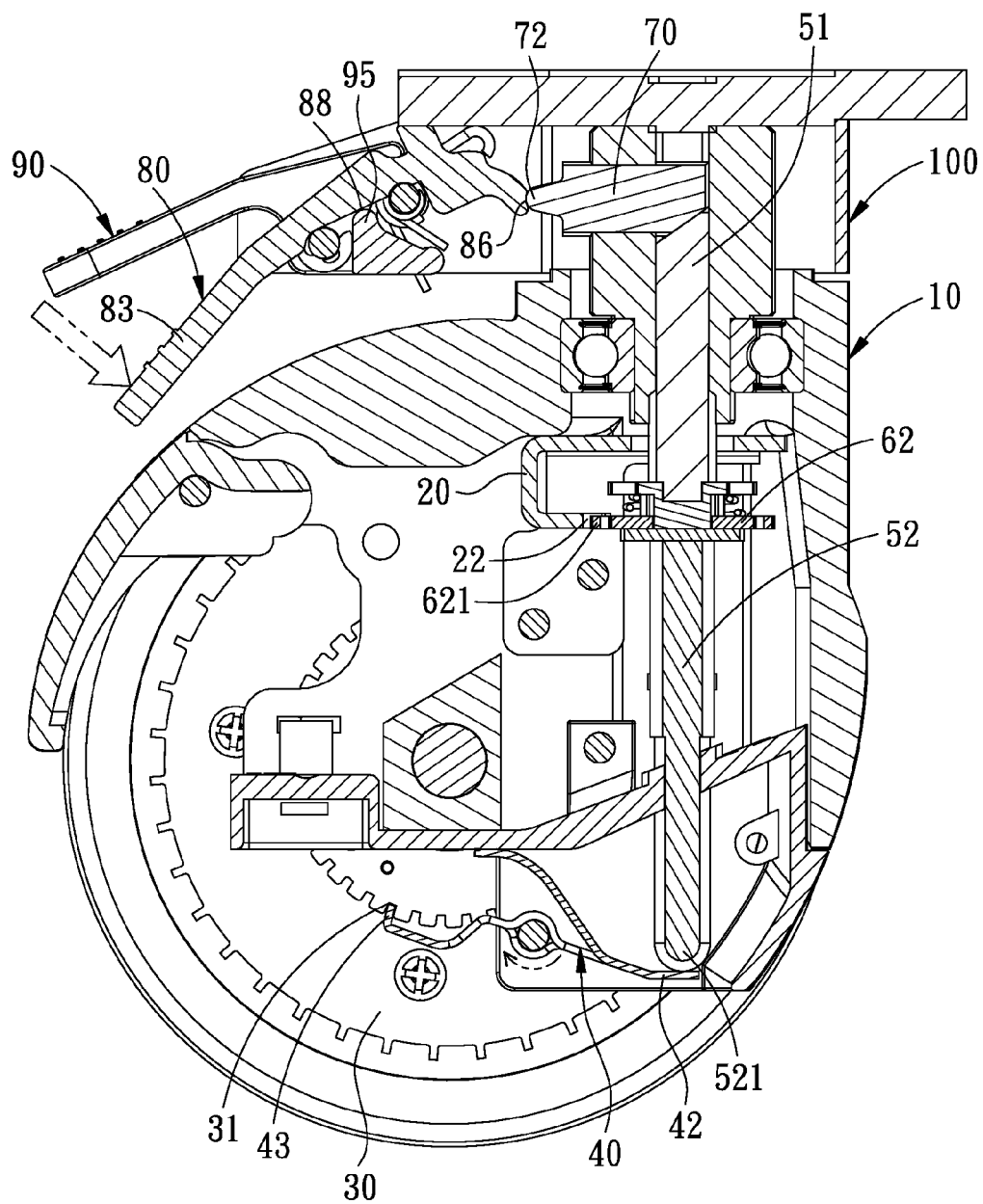
FIG. 7 shows that the brake function of the castor of the present invention has been activated.

To activate the brake function of the castor in accordance with the present invention, as shown in FIGS. 3 and 7, firstly, the user has to press down the operation pedal portion 83 of the brake pedal 80 to make the brake stepped portion 86 of the brake pedal 80 press against the press portion 72, and make the second abutting surface 88 of the brake pedal 80 abut against the second brake-release protrusion 95 of the brake-release pedal 90. At this moment, the transverse rod 70 will move a distance toward the first longitudinal rod 51, and the first and second longitudinal rods 51, 52 will move downward a distance. Meanwhile, the first and second longitudinal rods 51, 52 drive the engaging toothed portion 621 of the first toothed member 62 to engage with the engaging tooth 22 of the engaging member 20, and as a result, the rotary seat 10 is unable to rotate with respect to the mounting seat 100. Furthermore, the second connecting portion 521 of the second longitudinal rod 52 presses against the brake press portion 42 to make the brake swing member 40 pivot an angle clockwise until the brake toothed portion 43 of the brake swing member 40 engage with the wheel toothed portion 31 of the wheel 30, so as to stop the wheel 30 from rotating with respect to the rotary seat 10, namely, the brake function is activated.

Figure 8:
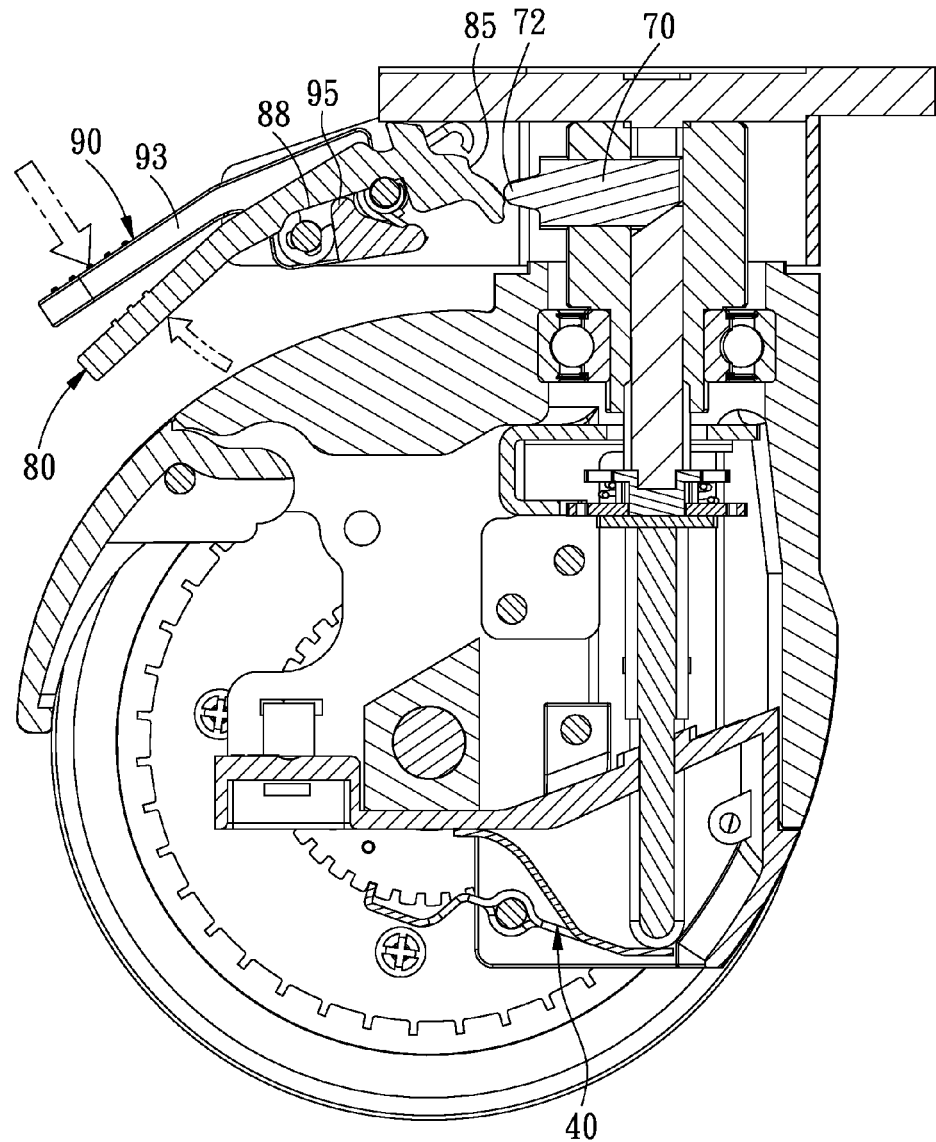
FIG. 8 shows that the brake function of the castor of the present invention has been deactivated.

To release or deactivate the brake function, as shown in FIG. 8, the user can press down the brake-release pedal portion 93 of the brake-release pedal 90 to make the second brake-release protrusion 95 push against the second abutting surface 88 of he brake pedal 80, then the brake pedal 80 pivots an angle clockwise back to the original position where the normal stepped portion 85 of the brake pedal 80 presses against the press portion 72 of the transverse rod 70, as shown in FIG. 6.

Figure 9:
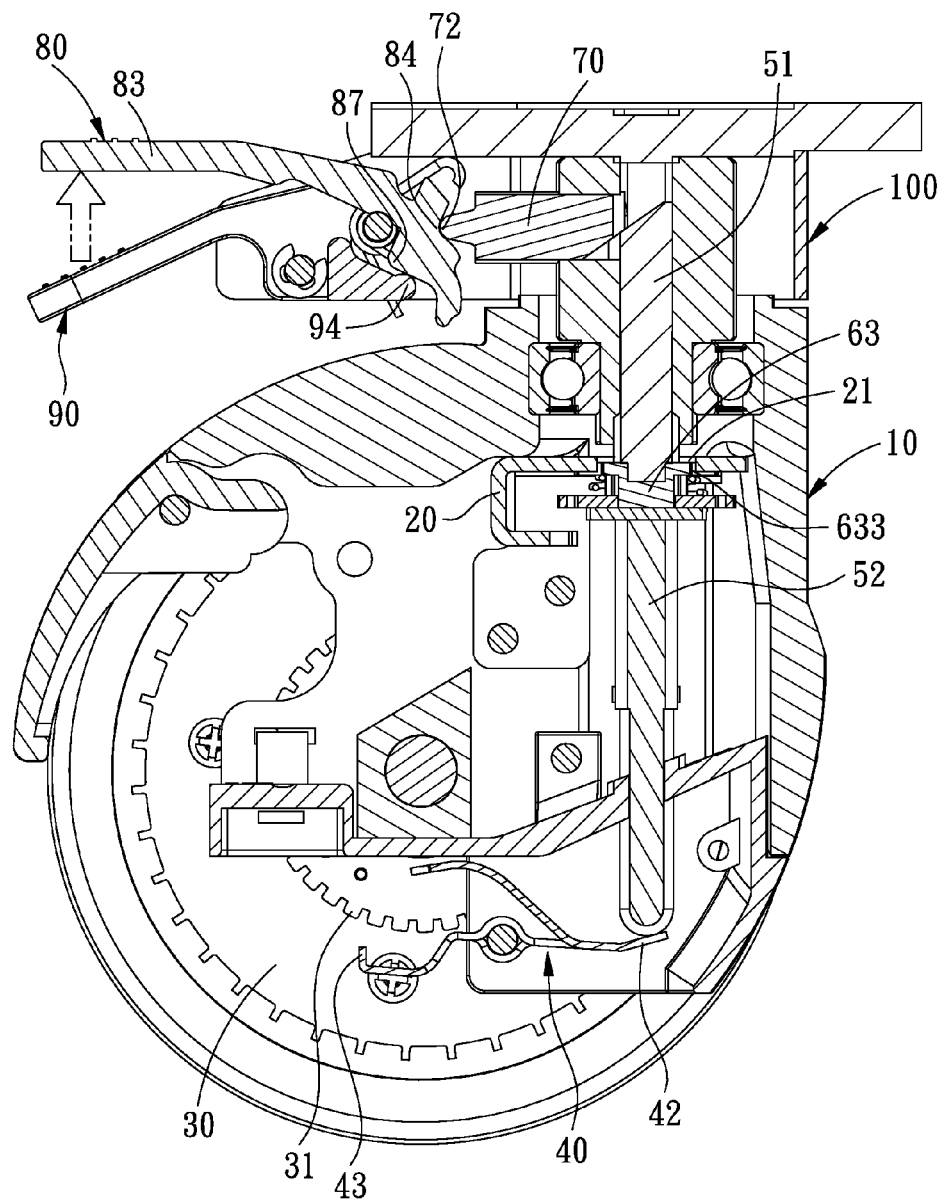
FIG. 9 shows that the directional function of the castor of the present invention has been activated.

To activate the direction function of the castor, as shown in FIGS. 3 and 9, the user has to pull the operation pedal portion 83 of the brake pedal 80 upward, to make the directional stepped portion 84 and the first abutting surface 87 of the brake pedal 80 press against the press portion 72 and the first brake-release protrusion 94 of the brake-release pedal 90, respectively. At this moment, there is a space allowing the transverse rod 70 to move back toward the first longitudinal rod 51, and the first and second longitudinal rods 51, 52 which are linked to each other will be pushed upward a distance by the brake press portion 42 of the brake swing member 40. Meanwhile, the first and second longitudinal rods 51, 52 will drive the protruding engaging portion 633 of the second toothed member 63 to engage with the engaging hole 21 of the engaging member 20, so as to stop the rotary seat 10 from rotating with respect to the mounting seat 100. Furthermore, the brake press portion 42 of the brake swing member 40 is not pressed by the second end 522 of the second longitudinal rod 52 anymore, the brake toothed portion 43 of the brake swing member 40 will disengage from the wheel toothed portion 31 of the wheel 30 to allow the wheel 30 to rotate with respect to the rotary seat 10. At this moment, the rotary seat 10 is stopped from rotating with respect to the mounting seat 100, while the wheel 30 is able to rotate relative to the rotary seat 10, therefore, the castor of the present invention is allowed to run in a predetermined direction, and thus the directional function is activated.

Figure 10:
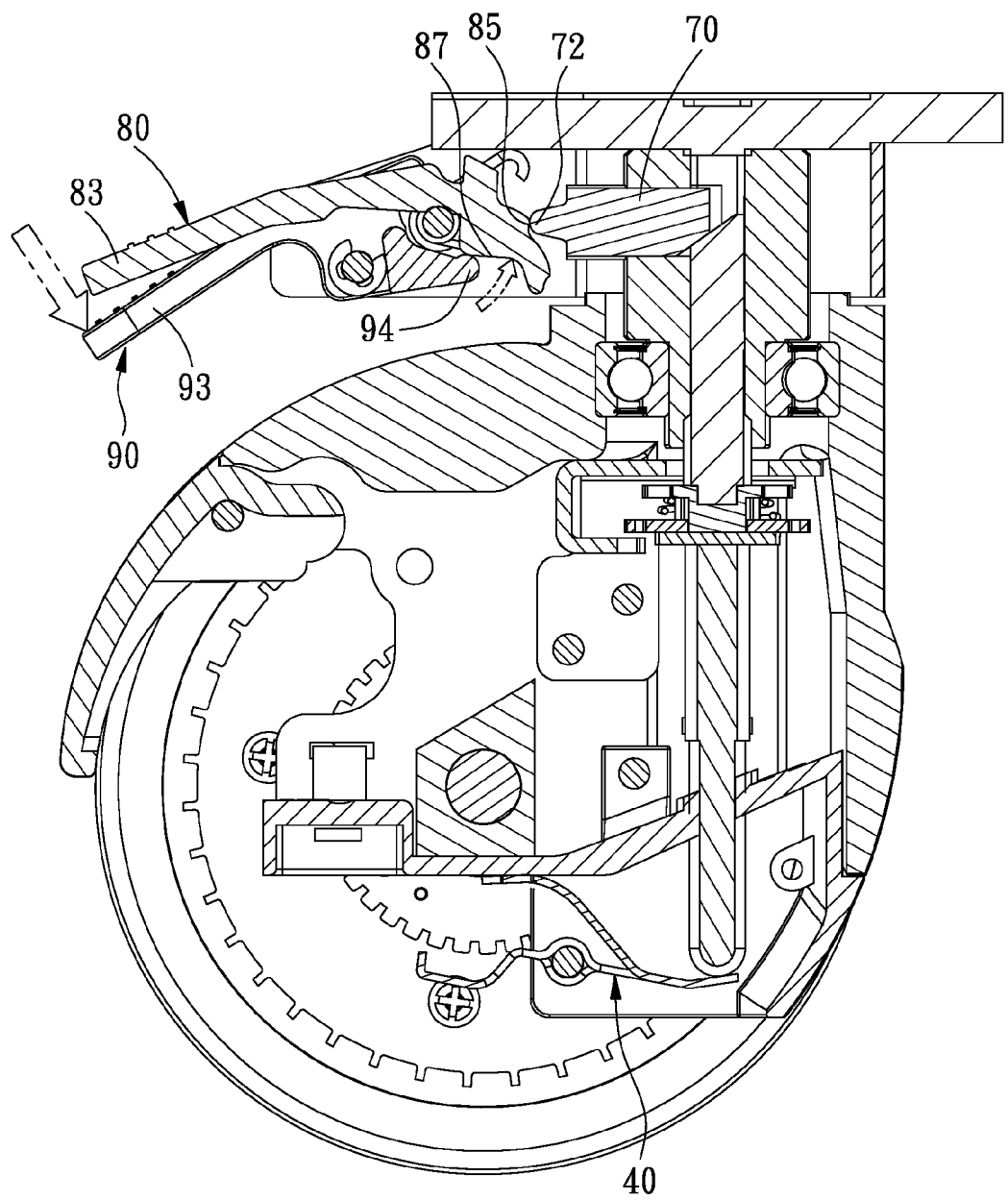
FIG. 10 shows that the directional function of the castor of the present invention has been deactivated.

To release or deactivate the directional function, as shown in FIG. 10, the user can press down the brake-release pedal portion 93 of the brake-release pedal 90 to make the first brake-release protrusion 94 push against the first abutting surface 87 of the brake pedal 80, then the brake pedal 80 pivot an angle counterclockwise to move back to its original position where the normal stepped portion 85 of the brake pedal 80 presses against the press portion 72 of the transverse rod 70.

While we have shown and described various embodiments in accordance with the present invention, it is clear to those skilled in the art that further embodiments may be made without departing from the scope of the present invention.

What is claimed is:

1. A multifunctional castor comprising:
a mounting seat with a shaft portion;
a rotary seat rotatably mounted on the mounting seat and having a pivot portion pivoted to the shaft portion;
an engaging member fixed in the rotary seat and including an engaging hole and an engaging tooth;
a wheel rotatably disposed on the rotary seat and including a wheel toothed portion;
a brake swing member including a brake pivot portion pivoted to the rotary seat, a brake press portion located at one side of the brake pivot portion, and a brake toothed portion located at another side of the brake pivot portion and used to engage with or disengage from the wheel toothed portion;
a longitudinal rod assembly disposed in the shaft portion and the rotary seat in such a manner that the longitudinal rod assembly is moveable along an axial direction of the shaft portion and includes: a first end, a second end abutting against the brake press portion, and a first shoulder portion and a second shoulder portion between the first and second ends;
an engaging assembly disposed between the first and second shoulder portions of the longitudinal rod assembly and including a protruding engaging portion for engaging with or disengaging from the engaging hole of the engaging member, and an engaging toothed portion for engaging with or disengaging from the engaging tooth of the engaging member;
a transverse rod inserted in the shaft portion and including a push portion for pushing against the first end of the longitudinal rod assembly, and a press portion located opposite the push portion;
a brake pedal pivotally mounted on the mounting seat and including an operation pivot portion pivoted to the mounting seat, an operation pedal portion located at one end of the operation pivot portion, and a directional stepped portion, a normal stepped portion and a brake stepped portion which are located at another end of the operation pivot portion and selectively pressed against the press portion of the transverse rod, when the normal stepped portion is pressed against the press portion, the protruding engaging portion and the engaging toothed portion of engaging assembly are disengaged from the engaging tooth and the engaging hole of the engaging member, respectively, the brake toothed portion of the brake swing member is disengaged from the wheel toothed portion of the wheel, so that the rotary seat is allowed to rotate with respect to the mounting seat, and the wheel is allowed to rotate relative to the rotary seat, when the directional stepped portion is pressed against the press portion, and the protruding engaging portion of the second toothed member is engaged in the engaging hole of the engaging member, the rotary seat is unable to rotate with respect to the mounting seat, when the brake stepped portion is pressed against the press portion, the engaging toothed portion of the engaging assembly is engaged with the engaging tooth of the engaging member, and the brake toothed portion of the brake swing member engages with the wheel toothed portion of the wheel, the wheel is stopped from rotating with respect to the rotary seat; and
a brake-release pedal pivotally disposed in the mounting seat in such a manner that the brake-release pedal will pivot back to its original position after being pressed down, and pressing down the brake-release pedal makes the normal stepped portion of the brake pedal push against the press portion.

2. The multifunctional castor as claimed in claim 1, wherein the mounting seat includes a fixing portion fixed to a bottom of the equipment.

3. The multifunctional castor as claimed in claim 1, wherein a bearing is disposed between the pivot portion and the shaft portion of the mounting seat.

4. The multifunctional castor as claimed in claim 1, wherein the longitudinal rod assembly includes a first longitudinal rod and a second longitudinal rod, the first longitudinal rod is disposed in the shaft portion and movable along the axial direction of the shaft portion, the first longitudinal rod includes the first end, a first connecting portion opposite the first end, and the first shoulder portion located between the first end and the first connecting portion, the second longitudinal rod includes a second connecting portion for connecting the first connecting portion, the second end located opposite the second connecting portion and leaned against the brake press portion, and the second shoulder portion located between the second connecting portion and the second end, so that the engaging assembly is disposed between the first and second shoulder portions.

5. The multifunctional castor as claimed in claim 4, wherein the engaging assembly includes a washer, a first toothed member, a second toothed member and a spring, the washer is sleeved on the second connecting portion of the second longitudinal rod and abutted against the second shoulder portion, the first toothed member is sleeved onto the second connecting portion and includes the engaging toothed portion and an inner toothed hole, the second toothed member is sleeved onto the second connecting portion and abutted against the washer and includes a toothed cavity for insertion of the first connecting portion of the first longitudinal rod, an annular portion against which is the first shoulder portion is abutted, the protruding engaging portion located around the annular portion, and a toothed portion inserted in the inner toothed hole of the first toothed member, and the spring is disposed between the first toothed member and the annular portion of the second toothed member.

6. The multifunctional castor as claimed in claim 4, wherein the push portion is pushed against the first end of the first longitudinal rod via slanting surfaces.

7. The multifunctional castor as claimed in claim 1, wherein the rotary seat includes a main body on which being formed the pivot portion, and a secondary body which is formed on the main body and includes an abutting portion, the brake swing member further comprises a brake elastic portion connected to the brake press portion and used to press against the abutting portion of the secondary body, so as to produce an upward push force for pushing the brake press portion.

8. The multifunctional castor as claimed in claim 1, wherein the brake-release pedal includes a brake-release pivot portion pivoted to the mounting seat, a brake-release pedal portion at one end of the brake-release pivot portion, and a first brake-release protrusion and a second brake-release protrusion at another end of the brake-release pivot portion, the brake pedal further comprises a first abutting surface located at the same side as the operation pedal portion, and a second abutting surface located at the same side as the directional stepped portion, when the directional stepped portion is pressed by the press portion, the first abutting surface abuts against the first brake-release protrusion, and when the brake stepped portion is pressed by the press portion, the second abutting surface abuts against the second brake-release protrusion.

* * * * *